Patented June 14, 1932

1,862,696

UNITED STATES PATENT OFFICE

FLOYD J. METZGER, OF NEW YORK, N. Y., ASSIGNOR TO AIR REDUCTION COMPANY, INCORPORATED, OF NEW YORK, N. Y., A CORPORATION OF NEW YORK

GENERATION AND APPLICATION OF AMMONIA AND COMPOSITION THEREFOR

No Drawing.   Application filed March 9, 1928. Serial No. 260,551.

This invention relates to improvements in the generation and application of ammonia and in compositions for use therein. The invention includes improvements in the production or generation of ammonia, improvements in the application of ammonia, and improvements in compositions for use in such generation and/or application.

According to the present invention ammonia is generated by the treatment of calcium cyanamid with steam at a predetermined high temperature at which the steam will react with the cyanamid to produce ammonia; and the ammonia so generated is utilized while still at a high temperature for purposes where ammonia is desirable at such high temperature.

The present invention provides an improved two-step process in which ammonia is utilized or applied at a high temperature and in which the ammonia so utilized or applied is generated at a high temperature by the action of water vapor or steam on calcium cyanamid. The two steps are, however, combined into a unitary process in which the production or generation of the ammonia and its application or utilization form part of the same operation.

The process of the present invention is of more or less general application for purposes where ammonia is desired as a reagent or catalyst or activator, etc. at a high temperature. The invention is applicable for example for the treatment at high temperatures of various substances with which the ammonia will react, or upon which the ammonia will react, or where treatment with ammonia is desired at a high temperature, or where the ammonia is to be employed by decomposition or otherwise, at a high temperature, etc.

The method of the present invention can be carried out at various predetermined temperatures, with gradual and continuous generation and application of ammonia over an extended period of time and at a substantially uniform and predetermined rate or with generation of relatively large amounts of ammonia rapidly at predetermined temperatures.

Among the applications of the improved process of the present invention may be mentioned the application of ammonia as a catalyst or activator of various chemical reactions, such as the vulcanization of rubber, or as a condensing agent in the synthesis of resins from phenols and formaldehyde or other methylene containing substances. Among other applications of the invention is included the treatment of metals at high temperature with ammonia or reaction or decomposition products thereof, as more particularly set forth in my companion application Ser. No. 260,552.

In the practice of the process of the invention calcium cyanamid is heated to a high temperature in contact with or in admixture with or in proximity to the materials to be treated with or acted upon by the ammonia or its reaction or decomposition products, and the hot cyanamid is subjected to the action of steam or water vapor at the elevated temperature to set free ammonia. In this way, the ammonia is generated either within or in contact with or close proximity to the substance or material to be acted upon thereby. The steam for acting upon the cyanamid may be supplied in the form of superheated steam or of saturated steam which may be further heated before or during the time it is brought into contact with the cyanamid.

The temperature of the cyanamid can be regulated and the temperature of the steam and of the reaction of the steam with the cyanamid can be regulated to cause the generation of ammonia to take place at the desired predetermined temperature and rate for carrying out the particular application of ammonia desired at the elevated temperature.

For some purposes, however, steam cannot be employed, as, for example, where the ammonia is to be generated within a plastic mass which is not penetrable by steam. In other cases steam may not be available at the location where the generation of ammonia is desired.

The present invention provides an improved process for the generation and application of ammonia which is particularly advantageous in cases where steam from a steam generator is not available or where such steam from a steam generator cannot be advantageously applied. In this improved process the calcium cyanamid is admixed with a dry or substantially dry substance containing water combined chemically or as water of crystallization therewith, but which will give off water at an elevated temperature, and this mixture is then heated to the requisite high temperature for setting free the water and causing the reaction of the resulting water vapor or steam with the cyanamid to generate ammonia. Ammonia can be generated in this way in an advantageous manner, for various purposes, for example, for use in the vulcanization of rubber, or for use as a catalytic or condensing agent in making synthetic resins, e. g., from phenols and methylene containing substances.

The substances which are admixed with the calcium cyanamid in making the new composition, and in carrying out the improved process of the invention, belong in general to the class of substances which contain water of combination or crystallization and which give up the water when heated to predetermined high temperatures. A substance which is particularly valuable for certain purposes is hydrated lime which when heated sufficiently high gives off water and becomes dehydrated. Another valuable substance for certain purposes is gypsum which contains water of crystallization which is given up at elevated temperatures. Hydrated oxides of other metals, such as zinc hydroxide, aluminum hydroxide, ferric hydroxide, etc. can also be employed. Mineral substances such as hydrated silicates, zeolites, talc, etc. can also be employed. The particular substance employed for admixture with the calcium cyanamid will depend upon the purpose for which the ammonia is to be generated and applied. The substance should be one which gives off water vapor at the temperature to be attained in the process and which leaves a residue which is unobjectionable for the particular purpose or under the particular circumstances where the reaction is desired.

The proportions of calcium cyanamid and of the other substance or substances employed therewith can be varied. In some cases the proportions should be such that sufficient water vapor or steam will be given off from the substance containing water of combination to react with all or practically all of the cyanamid to set free the maximum amount of ammonia therefrom. In some cases an excess of the water-containing substance may be employed, for example, to insure complete decomposition of the cyanamid, or to increase the rate of ammonia generation.

Where an excess of water vapor or steam is objectionable, the amount of the water-containing substance is reduced, and, for some purposes, a considerable excess of cyanamid may be employed so that only part of the cyanamid is decomposed and ammonia generated therefrom. The residue can be employed in admixture with additional water-containing substances in the subsequent carrying out of the process, with further additions of calcium cyanamid if desired to give the proper proportions in the mixture.

For use at comparatively low temperatures gypsum may be admixed with the calcium cyanamid and the dry mixture heated to set free the water of combination. Gypsum has a dissociation pressure of about 100 mm. at 60° C. and about 710 mm. at 100° C. Magnesium hydroxide can be employed in admixture with calcium cyanamid to form a dry mixture which when heated will serve for generating ammonia at temperatures up to say 160° C., at which temperature magnesium hydroxide has a dissociation pressure of approximately 760 mm. Calcium hydroxide has a dissociation pressure of 760 mm. at about 550° C. It may advantageously be employed in admixture with calcium cyanamid for generating ammonia at comparatively high temperatures up to its temperature of complete dissociation and dehydration. For example, a mixture of hydrated lime (calcium hydroxide) with commercial calcium cyanamid in proportion of 2 parts of the former to 1 of the latter form a suitable mixture for slowly and continuously liberating ammonia over an extended period of time, and at a temperature up to around 400° to 600° C.

For generating and applying ammonia at still higher temperatures admixtures of calcium cyanamid can be employed with other substances containing combined water which have relatively low dissociation pressures, such, for example, as aluminum hydroxide, ferric hydroxide, etc.

At high temperatures ammonia dissociates to a considerable extent, so that the reaction of the water vapor or steam on the cyanamid may be accompanied by decomposition of ammonia and the formation of an equilibrium mixture containing a relatively small amount of ammonia and relatively large amounts of nitrogen and hydrogen. The method is of particular value, however, for purposes where the action of nascent ammonia or of its decomposition products when produced in a nascent state is desired.

For some purposes organic substances containing combined water may be employed in admixture with the calcium cyanamid, such as certain carbohydrates, which liberate water on heating. The substances which can be employed thus cover a variety of substances differing widely in their chemical nature, but having the common property of containing combined water and of being capable of releasing water in suitable amount and at the operating temperature.

The calcium cyanamid employed may be the commercial cyanamid or the crude calcium cyanamid. The crude calcium cyanamid may contain unacted upon carbide and also free lime and in such case it may be treated with water in sufficient amount to decompose any carbide and to partially hydrate the free lime present in it. Crude calcium cyanamid as it is taken from the furnaces contains approximately 20% to 25% nitrogen in the form of cyanamid; about 12% lime and approximately 12% carbon in addition to small quantities of impurity derived from the raw materials. By partially hydrating the lime, the water combined with the lime by the hydration is available for use in the process if the process is one in which the reacting mixture is to be heated to a sufficient temperature to decompose the hydrated lime.

The admixture of the calcium cyanamid and of the substance containing combined water may take place in any suitable manner. For some purposes, relatively coarse materials can be employed. For other purposes it is important to obtain an intimate intermixture of the ingredients so as to insure the presence of the substance containing combined water in close proximity to the calcium cyanamid.

For admixing with plastics such as rubber, for example, the mixture should be sufficiently intimate so that the individual particles of calcium cyanamid and the substance containing combined water are not prevented by intervening rubber from reacting by preventing contact of water vapor with the cyanamid. For admixture with plastics such as rubber, moreover, it is important to have both the calcium cyanamid and the other substance, such as hydrated lime or zinc hydroxide, in a finely divided state and in intimate admixture so that the residue from the reaction will be uniformly distributed in the form of fine particles throughout the vulcanized rubber or other plastic mass.

It will be appreciated that the particular water-supplying components of the mixture should be properly selected so that water vapors will be given off and the ammonia generated at the proper temperature for its application, and that the residue from such substances should not be deleterious in its action upon the materials being treated.

This is particularly the case where the residue from the reaction is incorporated with the materials being treated and remains in the finished product. For such purposes, the water-supplying material should be one which does not leave a deleterious residue in the finished product but one which is unobjectionable or one which may even impart improved and desirable properties to the finished product. For use in the vulcanization of rubber for example, an intimate mixture of calcium cyanamid and gypsum or of calcium cyanamid and zinc hydroxide may be satisfactorily employed, since the residue from the reaction forms a desirable compounding material for the vulcanized rubber.

The composition resulting from the admixture of the calcium cyanamid and the substances containing combined water forms a new and valuable composition. It is made up of ingredients which are dry or practically so, and the mixture can be shipped and stored and handled at ordinary temperatures. It can be made up in predetermined proportions for the particular purpose in view, and the ingredients incorporated with each other to the extent required for the intended purpose. This intimate incorporation can be effected for example by fine grinding of the ingredients in a ball mill or other mill so as to insure a sufficient fineness of subdivision of the particles and a sufficiently intimate intermixture of them.

The new composition can be packaged and stored and shipped and employed as required for the generation and application of ammonia.

In the utilization of the new composition and in the practice of the process of the present invention the mixture is heated from the ordinary temperature up to the temperature at which combined water will be given off and the reaction of the resulting water vapor with the calcium cyanamid will take place.

In some cases it may be desirable to apply the components of the mixture separately in layers or otherwise rather than in a previously mixed state as where a mass of materials is to be employed for the generation of ammonia to be used as a gaseous reagent upon other substances in close proximity to the point of generation. Further amounts of the mixture or of the components may be added intermittently or continuously to insure a continuous or prolonged generation of ammonia where this is desired.

In cases where the reacting materials are not physically admixed with the material to be treated thereby, they may be removed and used over again with further additions of calcium cyanamid or of the substance containing combined water or both. For example, an additional quantity of cyanamid may be required or an additional quantity of water containing constituent or of both may be necessary. In the case of calcium cyanamid which has been only partly decomposed, or even completely decomposed, the product will be made up largely of lime which can be dehydrated to form hydrated lime for further use as the water supplying material in cases where hydrated lime is suitable for that purpose.

The temperature of use of the composition and of generation and application of the ammonia will vary with the purpose for which the ammonia is applied. By suitably selecting the substance containing combined water so that it will give off the combined water at a predetermined temperature, an indirect control is obtained of the temperature and rate of formation and application of the ammonia. That is, the mixture may be so selected that the ammonia will be formed within certain predetermined temperature ranges, thus making possible the application of ammonia within such temperature ranges.

In cases where the new composition is not employed, but where steam is employed at predetermined high temperatures for action upon the calcium cyanamid the calcium cyanamid is first heated to the predetermined temperature in contact with or in close proximity to the materials to be treated with the generated ammonia or its decomposition products and steam is then brought into contact with the calcium cyanamid at the predetermined temperature to generate ammonia. The rate of ammonia generation can be regulated by regulating the rate of steam supply.

When the new composition is employed it will not give off ammonia to any appreciable extent until the predetermined temperature is reached, and the rate of ammonia generation can be regulated by selecting the water supplying material thereby producing ammonia at a regulated temperature.

The present invention thus provides an improved process for the production and application of ammonia for purposes for which ordinary gaseous ammonia cannot be satisfactorily employed. The present invention also provides a process which is valuable for use in place of gaseous ammonia whereby elaborate and cumbersome apparatus, such as gaseous ammonia requires, can be eliminated.

The present invention includes, among the applications of the process, a new and improved method of vulcanizing rubber, in which an intimate intermixture of calcium cyanamid and of a substance such as zinc hydroxide or gypsum, etc. containing combined water is incorporated with the rubber mix so that, when the mixture is heated in the press to effect vulcanization ammonia will be generated in situ within the rubber mass.

It has long been known that ammonia is an accelerator of the vulcanization of rubber; but gaseous ammonia is difficult to employ in definite predetermined amounts. By employing calcium cyanamid and a suitable substance containing combined water and adding an intimate intermixture of these materials with the rubber, a regulated amount of ammonia can be generated within the rubber mass at the vulcanization temperature. In this way, a predetermined amount of ammonia may be employed, e. g. ¼% or ½% or more based on the rubber. The residue from the calcium cyanamid is mainly lime which forms a desirable compounding ingredient and which also has accelerating properties. The residue from a material such as zinc hydroxide is zinc oxide which is a valuable rubber compounding material.

The vulcanization of rubber can be carried out in the ordinary way at the steam pressures and temperatures commonly employed with other accelerators. Pure gum formulas may be employed and in such cases the residue from the calcium cyanamid and from the zinc hydroxide, etc. will supply small amounts of compounding materials to the vulcanized rubber. Zinc oxide formulas or treat stock formulas or other formulas containing various compounding materials can be similarly accelerated by incorporating therewith the new ammonia-generating composition in regulated amounts.

As a specific example of the use of this invention as applied to the vulcanization of rubber a formula commonly used in the making of tire tread stock was followed.

The ingredients were as follows:

| | Parts |
|---|---|
| Crepe rubber | 51.0 |
| Carbon black | 19.0 |
| Zinc oxide | 20.5 |
| Sulphur | 2.25 |
| Mineral rubber (asphalt) | 3.5 |
| Cyanamide accelerator | 13.5 |

The cyanamide accelerator used was composed of two parts by weight of zinc hydroxide, and one part by weight of calcium cyanamide. The vulcanization was carried on for 1¼ hours at a temperature of 100° C.

The new compositions of the present invention can also be employed for admixture with other plastic compositions which are to be molded at a high temperature and where ammonia is desired as an accelerator or catalytic or condensing agent. The composition can be employed, for example, in molding mixtures containing intermediate condensation products such as bakelite where the molding operation is to be carried out at a high temperature. By adding a few percent or even much larger amounts in some cases of the mixture of calcium cyanamid and of other substance-containing combined water to the molding mixture and intimately incorporating it therewith, the reaction between the water-containing substance and the calcium cyanamid with evolution of ammonia will take place during the molding operation, thus forming the ammonia in situ and under the high molding pressure. In this way, the speed of hardening or condensation can be materially promoted, and the operation can be regulated by regulating the amount of the composition added. The water-supplying substance in this case should be one which leaves a residue which is unobjectionable in the molding mixture.

Another important application of the process and composition of the present invention is in the treating of metals at a high temperature as set forth in my companion application, Serial No. 260,552, according to which ammonia is generated from calcium cyanamid and the ammonia or its decomposition products is caused to act upon the metal immediately after its generation, for example, by passing steam into contact with hot calcium cyanamid placed in direct contact with the metal surface to be hardened, or by embedding the metal in a composition of, for example, calcium cyanamid and hydrated lime, and heating the mixture to a temperature sufficient to dehydrate the lime and cause the water vapor to react with the cyanamid to produce ammonia or its decomposition products in a nascent state for hardening the metal surfaces. In treating such metal surfaces, the temperature of treatment is limited to temperatures at which the steam does not have any objectionable action on the metal, but the process can satisfactorily be carried out at temperatures up to around 600° C. or higher.

It will thus be seen that the present invention provides an improved process for the generation and application of ammonia in which the ammonia can be supplied continuously and regularly over a prolonged period of time, or rapidly over a short period of time, at a predetermined high temperature. It will further be seen that the method of generating and applying ammonia can be regulated as to temperature and rate of ammonia generation, and that the ammonia can be generated in situ at the regulated temperatures.

It will further be seen that the invention includes a new composition which is stable and can be stored and shipped at ordinary temperatures, but which on heating to elevated temperatures will generate ammonia.

It will further be seen that the invention provides an improved method of generating and applying ammonia in situ where the new composition is admixed with plastic or other substances and heated in such admixture to generate ammonia in situ so that it may act at the high temperature of generation upon the materials with which the composition is compounded.

Variations and modifications can be made in the invention and in the specific compositions and methods described without departing from the spirit and scope of the invention.

I claim:—

1. The method of generating ammonia which comprises admixing calcium cyanamid with an inorganic material containing combined water to form a mixture substantially dry at ordinary temperatures, and heating the resulting mixture to a sufficient temperature to drive off the water of combination and to cause it to react with the calcium cyanamid to produce ammonia.

2. The method of generating ammonia which comprises admixing calcium cyanamid with a hydrated metal oxide to form a mixture substantially dry at ordinary temperatures and heating the resulting mixture to a sufficient temperature to dehydrate the metal oxide and to cause the water set free therefrom to act upon the calcium cyanamid to generate ammonia.

3. The method of generating ammonia which comprises admixing hydrated lime with calcium cyanamid to form a substantially dry mixture at ordinary temperatures, and heating the resulting mixture to a temperature sufficient to dehydrate the lime and to cause the water therefrom to act upon the calcium cyanamid to form ammonia.

4. The method of generating ammonia which comprises admixing commercial calcium cyanamid and hydrated lime in the proportion of about one part cyanamid to two parts of lime and heating the resulting mixture to a temperature sufficient to dehyrate the lime and cause the water therefrom to act upon the calcium cyanamid to produce ammonia.

5. A new composition for use in the generation and application of ammonia comprising calcium cyanamid and an inorganic substance containing combined water, the same being intimately admixed to form a substantially dry mixture at ordinary temperature which can be stored and shipped and which on heating to a high temperature will give off combined water which will react with the calcium cyanamid to form ammonia.

6. A new composition for use in the generation and application of ammonia comprising calcium cyanamid and an alkali earth hydroxide, the same being intimately admixed to form a substantially dry mixture at ordinary temperatures which can be stored and shipped and which on heating to a high temperature will give off combined water which will react with the calcium cyanamid to form ammonia.

In testimony whereof I affix my signature.

FLOYD J. METZGER.